United States Patent
Brown et al.

(10) Patent No.: US 7,112,898 B2
(45) Date of Patent: Sep. 26, 2006

(54) REAL-TIME DIGITAL VOLTAGE SAG COMPENSATOR

(75) Inventors: Scott R. Brown, Wake Forest, NC (US); Mark J. Kocher, Raleigh, NC (US); Roy S. Colby, Raleigh, NC (US); Robert J. Dwulet, Wake Forest, NC (US); Timothy B Phillips, Raleigh, NC (US)

(73) Assignee: Square D Company, Palatine, IL (US)

( * ) Notice: Subject to any disclaimer, the term of this patent is extended or adjusted under 35 U.S.C. 154(b) by 531 days.

(21) Appl. No.: 10/058,863

(22) Filed: Jan. 28, 2002

(65) Prior Publication Data

US 2003/0141764 A1 Jul. 31, 2003

(51) Int. Cl.
*H02J 1/00* (2006.01)

(52) U.S. Cl. ....................... 307/103; 307/104

(58) Field of Classification Search ................. 307/96, 307/97, 103, 105, 131, 140, 1, 104
See application file for complete search history.

(56) References Cited

U.S. PATENT DOCUMENTS

| 4,500,837 | A | * | 2/1985 | Shuey et al. ................ 324/102 |
| 5,450,306 | A | * | 9/1995 | Garces et al. ................. 363/41 |
| 5,734,543 | A | * | 3/1998 | Turner ......................... 361/154 |
| 5,960,207 | A | * | 9/1999 | Brown ......................... 713/300 |
| 6,253,112 | B1 | * | 6/2001 | Flora-Holmquist et al. ... 700/19 |
| 6,400,127 | B1 | * | 6/2002 | Giannopoulos ............. 323/283 |
| 6,825,435 | B1 | * | 11/2004 | Brown ......................... 219/112 |

OTHER PUBLICATIONS

WO 95/29498, Perreira, G. Stephen, Nov. 2, 1995.*

* cited by examiner

*Primary Examiner*—Robert L. Deberadinis

(57) ABSTRACT

An economical digital voltage sag compensator for overcoming sags in distributed electrical power. The voltage sag compensator employs an inexpensive micro-controller, a full wave bridge rectifier, a DC power supply, a voltage divider and an output switch. The micro-controller continuously monitors and evaluates, with respect to a setpoint measured in volt-seconds, the rectified DC voltage. At regularly spaced trigger events, as determined by the micro-controller, the micro-controller concurrently monitors the rectified DC voltage, evaluates the monitored voltage with respect to the setpoint, produces an output signal and sends that output signal to the output switch. The output switch supplies an electrical device, connected electrically in series with the full wave bridge rectifier and the output switch, with a constant average current of sufficient level to maintain the electrical device in a desired operating condition. The constant average current is obtained by applying constant volt-seconds to the electrical device. The circuit also provides overvoltage protection to the electrical device.

21 Claims, 5 Drawing Sheets

REAL-TIME DIGITAL VOLTAGE SAG COMPENSATOR

CROSS-REFERENCE TO RELATED PATENTS

Not applicable

Statement Regarding Federally Sponsored Research or Development

Not applicable

Field of the Invention

The present invention relates to the field of electrical power quality, and particularly to an apparatus for real-time voltage sag compensation.

BRIEF DESCRIPTION OF THE DRAWINGS

The features of the invention will become more clearly understood from the following detailed description of the invention read together with the drawings in which.

Figure 1:
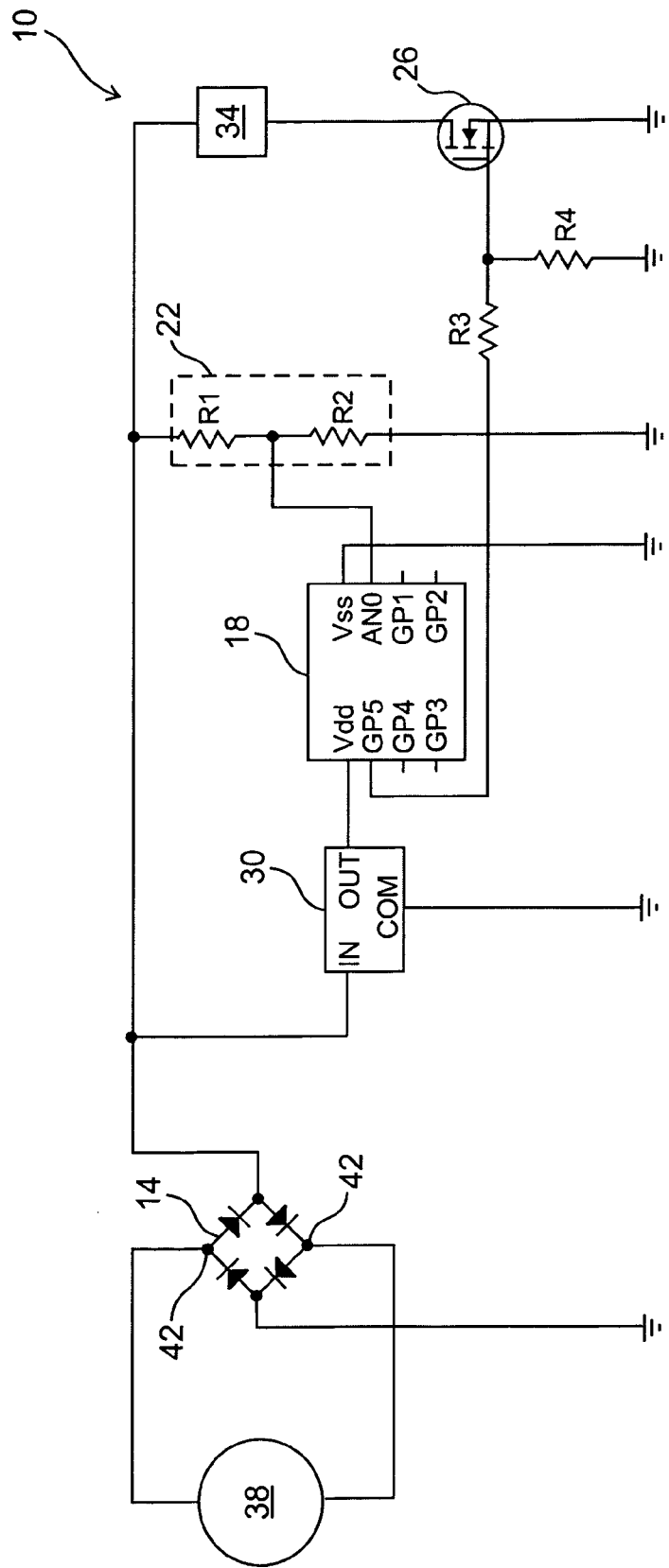
FIG. 1 is a circuit diagram of a basic voltage sag compensation circuit in accordance with the present invention.

Before one embodiment of the invention is explained in detail, it is to be understood that the invention is not limited in its application to the details of construction described herein or as illustrated in the drawings. The invention is capable of other embodiments and of being practiced or being carried out in various other ways. Further, it is to be understood that the phraseology and terminology used herein is for the purpose of description and should not be regarded as limiting.

DETAILED DESCRIPTION OF THE DRAWINGS

FIG. 1 illustrates a low part count, low cost, open loop, digital voltage sag compensation circuit, generally indicated by reference numeral 10, in accordance with the present invention. The voltage sag compensation circuit 10 includes a full wave bridge rectifier 14, a micro-controller 18, a voltage divider 22, an output switch 26 and a regulated DC power supply 30. The regulated DC power supply 30 provides power to the micro-controller 18 and a reference voltage for an analog to digital converter in the micro-controller 18. The voltage sag compensation circuit 10, provides a constant average current output to an electrical device 34 connected in series with the rectifier 14 by applying constant volt-seconds to the electrical device 34. This is accomplished by applying current, either AC or DC, from a power source 38 to the input terminals 42 of the full wave bridge rectifier 14. The micro-controller 18, through voltage divider 22, continuously monitors the rectified DC voltage at an evenly spaced sample rate. A trigger, which can be the zero crossing (minimum positive value of the rectified DC half cycle) or some other predetermined regularly spaced event and a trigger period, which is the interval between triggers are both defined in the firmware of the micro-controller 18. A set point, measured in volt-seconds (area under the rectified DC voltage curve), is determined based on the trigger period and a particular current level required to maintain the electrical device 34 in a desired operating state. At a point initiated by the trigger, and in concurrent operations, a segment of the evenly spaced rectified DC voltage samples is evaluated by the micro-controller 18 with respect to the set point, an output signal is produced by the microcontroller 18 and the output signal is received by the output switch 26. The output switch 26, which is electrically in series with the electrical device 34 and the rectified DC power, operates in response to the output signal by applying power in constant volt-seconds to the electrical device 34. The applied constant volt-seconds produces a constant average current of that particular current level required to maintain the electrical device 34 in the desired operating condition. Thus a sag in the power source 38 voltage is effectively transparent to the electrical device 34, provided the rectified DC voltage does not drop below a level at which the voltage sag compensation circuit 10 can not provide the constant average current required to maintain the electrical device 34 in the desired operational condition. Since the voltage sag compensation circuit 10 of the present invention monitors, evaluates and generates at least one output signal for each trigger period in real time, the level of constant average current applied to the electrical device 34 is more accurately maintained than current provided by a circuit which predicts an output signal based on the monitored value of the previous half cycle. Accuracy of the constant average current applied to the electrical device 34 can be increased by increasing the sample rate. The sample rate is limited by the time required for the micro-controller 18 to monitor, evaluate and produce the output signal. The voltage sag compensation circuit 10 of the present invention employs a minimum number of small, inexpensive and commonly available electrical components such that it can be an integral part of the electrical device 34 or can be a separate module for retrofitting an existing electrical device 34. Micro-controllers 18 such as Microchip Corporation's 12C67X family of controllers, Motorola's 68705, Atmel's AVR Tiny or similar controllers can be used in this circuit.

Figure 2:
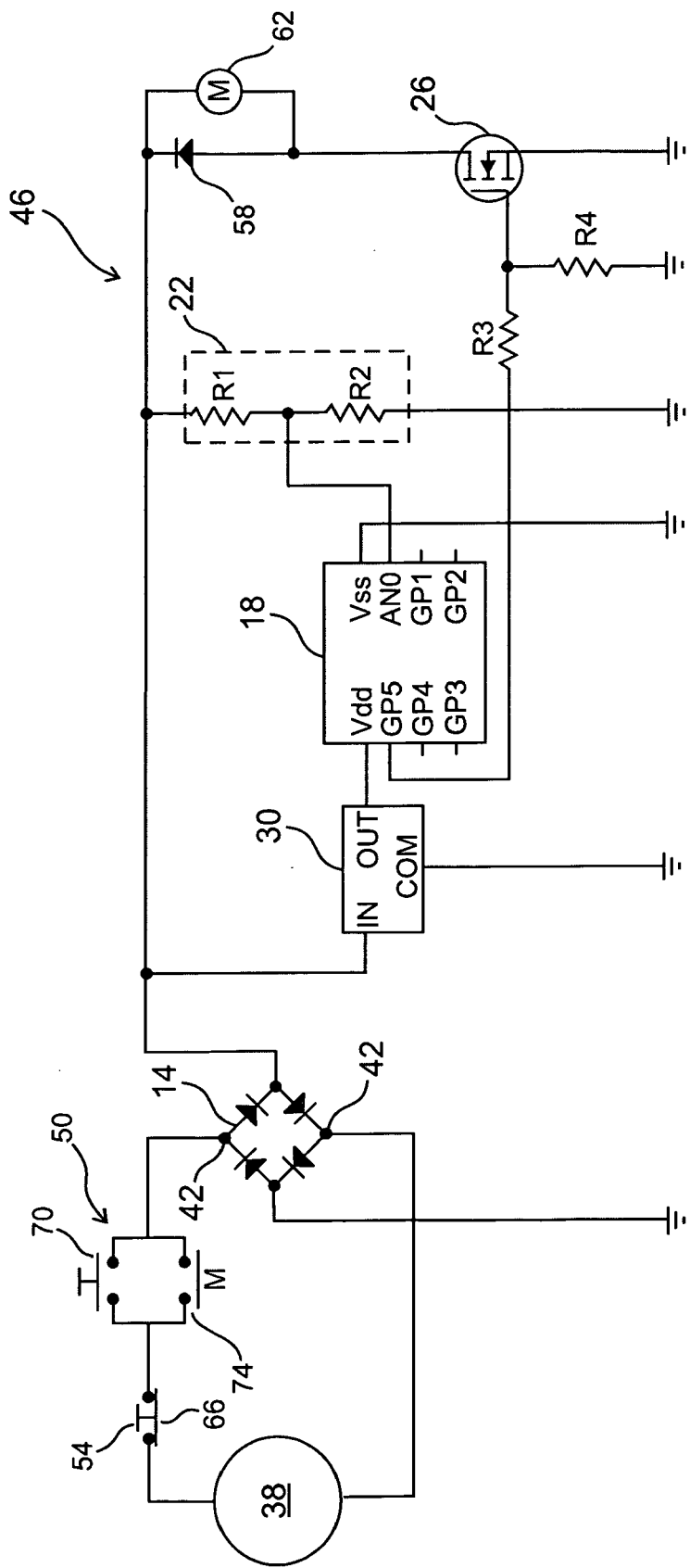
FIG. 2 is a circuit diagram of a FSM control circuit employing the voltage sag compensation circuit in accordance with the present invention.

FIG. 2 illustrates a three wire control circuit generally indicated by reference numeral 46 which includes all of the components of the voltage sag compensation circuit 10 of FIG. 1, and a start button 50, a stop button 54, a fly back diode 58 and an inductive load 62, such as a coil for a contactor, relay or starter in place of the electrical device 34. The control circuit 46 operates as a Finite State Machine, as defined by the National Institute of Standards and Technology: A model of computation consisting of a set of states, a start state, an input alphabet, and a transition function which maps input symbols and current states to a next state. The Finite State Machine control circuit 46 has four distinct states; dropout, pull-in, wait for trigger and apply volt-seconds. The four states of the FSM control circuit 46 produce three distinct operating conditions of the inductive load 62; dropout, pull-in and holding. The voltage sag compensation circuit 10, as described above will provide a constant average current sufficient to maintain the inductive load 62 in the holding condition (desired operating condition) during a voltage sag in the power source 38. However, other features of the circuit 10 are required to ensure sufficient current (about 10 time holding current) for the pull-in condition and a full dropout condition (no current flowing in the inductive load 62) when required. The FSM control circuit 46 will not receive power from the power source 38 until the start button 50 is pressed. Therefore, the FSM control circuit 46 is in the dropout state and the inductive load 62 is in the dropout condition. Upon pushing the start button 50, power is applied to the FSM control circuit 46, which remains in the dropout state. Vdd from the regulated power supply 30 rises slowly and therefore, the reference voltage used by an analog to digital converter in the micro-controller 18 does not reach its proper value immediately. The unstabilized reference voltage can cause the monitoring of the rectified DC voltage to be inaccurate. Therefore, the firmware of the FSM control circuit 46 checks for a saturated A/D input, which is indicated by a maximum value in the ADC input register in the micro-controller 18. When A/D input saturation is detected, the micro-controller 18 produces an output signal causing the output switch 26 to remain open, thereby maintaining the inductive load 62 in the dropout condition. This condition is maintained by the micro-controller 18 until two trigger periods pass without detection of an A/D input saturation. This delay allows the Analog to digital converter reference voltage to stabilize thereby permitting the analog to digital converter to provide accurate measurements. This saturation detection also provides over voltage protection to the output switch 26 and inductive load 62. After the reference voltage has stabilized, the micro-controller 18 firmware initiates the monitoring and evaluating of the rectified DC voltage. When the evaluation indicates that the rectified DC power is above a predetermined threshold determined by the voltage required to pull-in the inductive load 62, the FSM control circuit 46 enters the pull-in state. During the pull-in state the output signal from the micro-controller 18 will cause the output switch 26 to close for a predetermined period of time thereby providing 100% of the rectified DC power to the inductive load 62. As an alternative, a higher volt-seconds setpoint can be established during the pullin state to increase the constant average current applied to the inductive load 62. In either case, the predetermined period of time or the higher volt-seconds setpoint will be based on electrical parameters required for the particular inductive load 62 to successfully pull-in. After the pull-in state is complete, the FSM control circuit 46 enters a wait for trigger and apply volt-seconds state loop which maintains the inductive load 62 in the holding condition. During this loop of the wait for trigger and apply volt-seconds states, the micro-controller 18 operates generally as described above with respect to the voltage sag compensation circuit 10. In the FSM control circuit 46, there are certain situations which require immediate execution of the dropout condition and overriding of the holding condition. These situations are initiated by pressing the stop button 54, a normally closed, momentary switch 66, which initiates a shut down of any operation controlled by the FSM control circuit 46, and ultimately the inductive load 62. Certain features of the three wire FSM control circuit 46 can adversely effect this shut down operation. The start button 50 is a normally open, momentary switch 70 connected electrically in parallel with a latching contact 74 and in series with the normally closed switch 66 of the stop button 54. The latching contact 74 is maintained in the closed position by current flowing through the inductive load 62. The flyback diode 58 provides a current loop for the inductive load 62 during that part of the trigger period when the output switch 26 is not providing power to the inductive load 62. This loop current is intended to protect the output switch 26 from damage, but it also extends the time required for of the inductive load 62 to dropout. Therefore, it is possible that a very rapid activation of the normally closed momentary switch 66 of the stop button 54 is not sufficiently long enough for the latching contact 74 to drop out. This rapid activation of the stop button 54 could appear as a voltage sag in the power source 38 and therefore be compensated for by the voltage sag compensation circuit 10. Although the voltage sag compensation circuit 10 functions in its intended manner, maintaining the inductive load 62 in a holding condition after pressing the stop button 54 is not acceptable. The FSM control circuit 46 must have some means of preventing voltage sag compensation when a dropout condition of the inductive load 62 is desired. Therefore, if the rectified DC voltage drops below a predetermined level after a predetermined time or number of trigger periods, the FSM control circuit 46 will initiate an output signal to the output switch 26 placing the inductive load 62 in the dropout condition. Then the micro-controller 18 will enter a "sleep" mode (very low power consumption) during which no monitoring or evaluating of the rectified DC voltage will be done. The "sleep" mode ensures that the inductive load 62 has entered the dropout condition without draining the stored power in the power supply 30 to a point that would require the micro-controller 18 to reset. A "watchdog" timer in the micro-controller 18 will monitor the length of time the micro-controller 18 is in the "sleep" mode and, after a predetermined period of time sufficient for the inductive load 62 to dropout has elapsed, "wake up" the micro-controller 18. Upon waking up, the FSM control circuit 46 will enter the dropout state and begin monitoring and evaluating the rectified DC voltage. If the rectified DC voltage is present and is above that predetermined threshold required to pull-in the inductive load 62, the FSM control circuit 46 will enter the pull-in state. If the rectified DC voltage is not present or is below the predetermined threshold required to pull-in the inductive load 62 the FSM control circuit 46 will remain in the dropout state. The predetermined level of rectified DC voltage and the predetermined time or number of trigger periods can be established by an industry standard or by the electrical operating characteristics of the inductive load 62 and are maintained in the firmware of the micro-controller 18.

Figure 3:
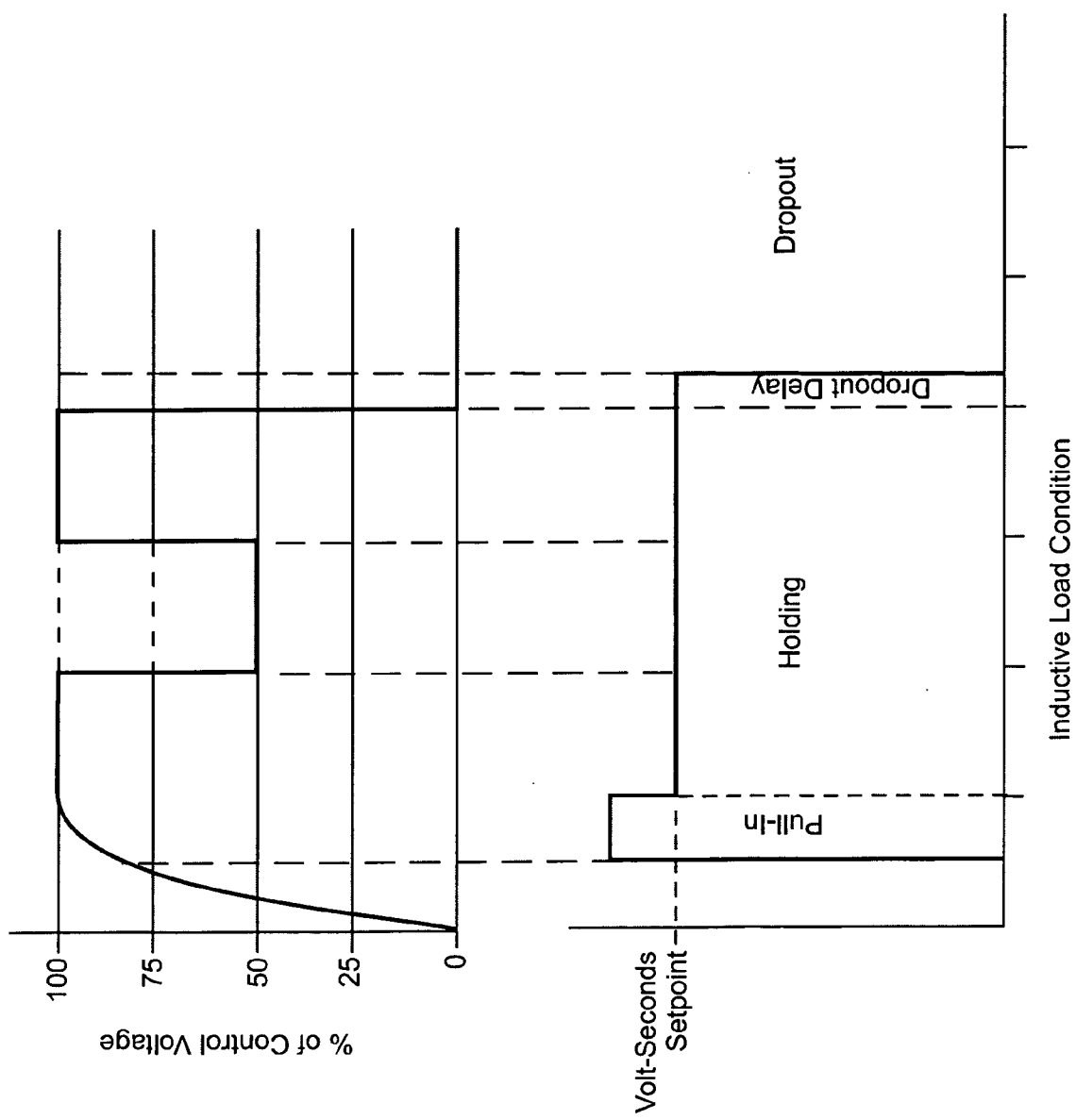
FIG. 3, is a graph illustrating the relationship of control circuit input voltage with respect to the operating condition of the inductive load.
Figure 5:
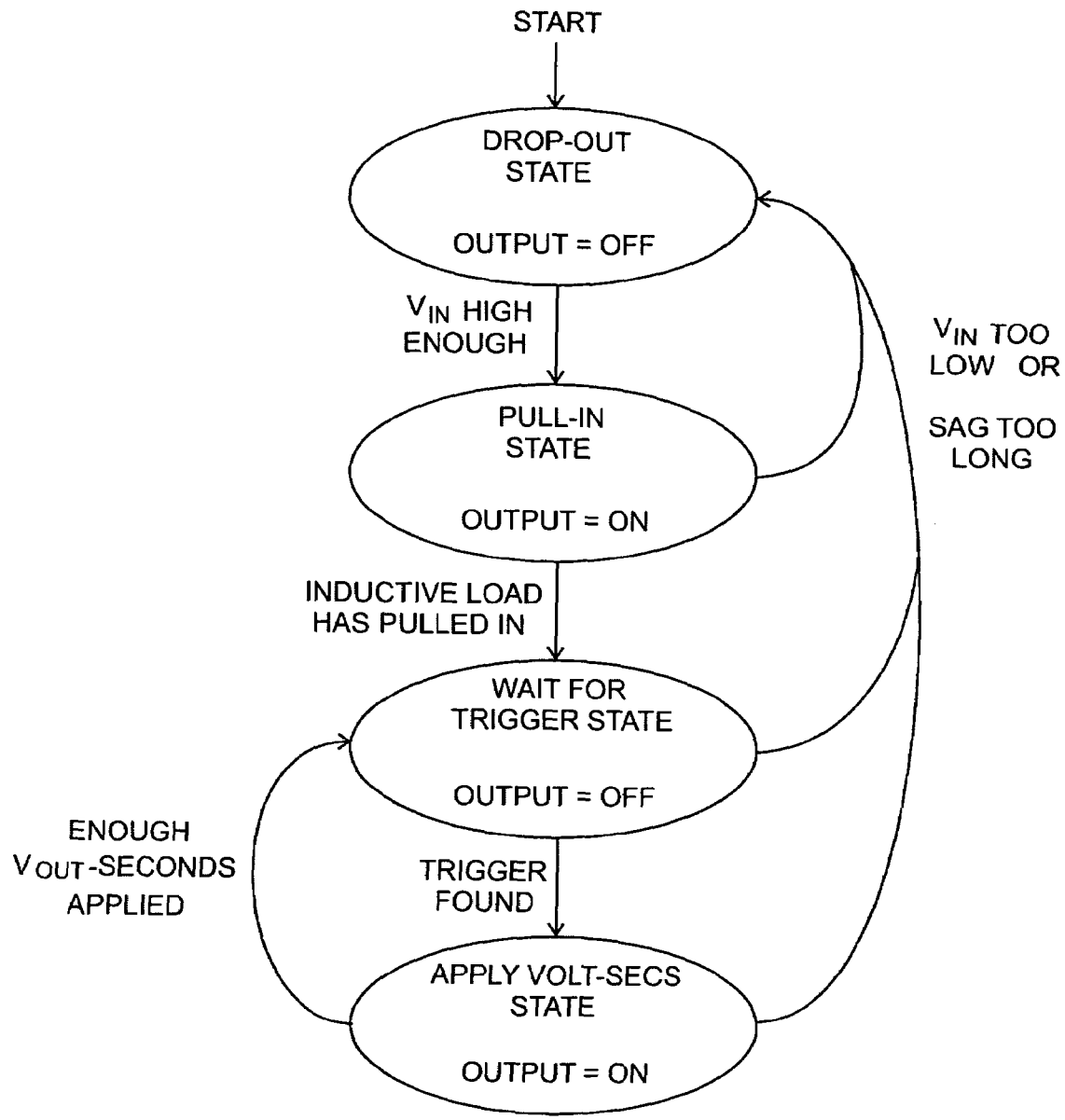
FIG. 5 is a state diagram of a FSM control circuit constructed in accordance with the present invention.

The following description is associated with both FIG. 3 and FIG. 5. The graph of FIG. 3 illustrates a comparison of control circuit input voltage versus each of the three operating conditions; pull-in, holding and dropout, of the inductive load 62. FIG. 5 is a state diagram of the FSM control circuit 46. When the start button in pressed, the input voltage to the FSM control circuit 46 begins to rise, the FSM control circuit 46 is in the dropout state and the inductive load 62 is in the dropout condition. In the dropout state, the FSM control circuit 46 output signal to the output switch 26 is OFF. When the FSM control circuit 46 voltage reaches about 80% of its nominal value the FSM control circuit 46 enters the pull-in state and the inductive load 62 is in the pull-in condition. In the pull-in state, the FSM control circuit 46 output signal to the output switch 26 is ON. With control voltage at its nominal level and after the pull-in state is complete, the FSM control circuit 46 enters the wait for trigger/apply volt-seconds state loop and the inductive load 62 is in the holding condition. In the wait for trigger state, the FSM control circuit 46 output signal to the output switch 26 is OFF and in the apply volt-seconds state, the FSM control circuit 46 output signal to the output switch 26 is ON. During a voltage sag event in which the control voltage does not drop below the dropout threshold, the FSM control circuit 46 will remain in the wait for trigger/apply volt-seconds state loop and the inductive load 62 will remain in the holding condition. When the control voltage returns to its nominal level the FSM control circuit 46 will remain in the wait for trigger/apply volt-seconds state loop and the inductive load 62 will remain in the holding condition. During a voltage sag event in which the control voltage drops below the dropout threshold, the FSM control circuit 46 will remain in the wait for trigger/apply volt-seconds state loop and the inductive load 62 will remain in the holding condition for a delay period of up to, for instance, 75 milliseconds. If the control voltage does not rise above the dropout threshold within the delay period, the FSM control circuit 46 will enter the dropout state and the inductive load 62 is in the dropout condition.

Figure 4:
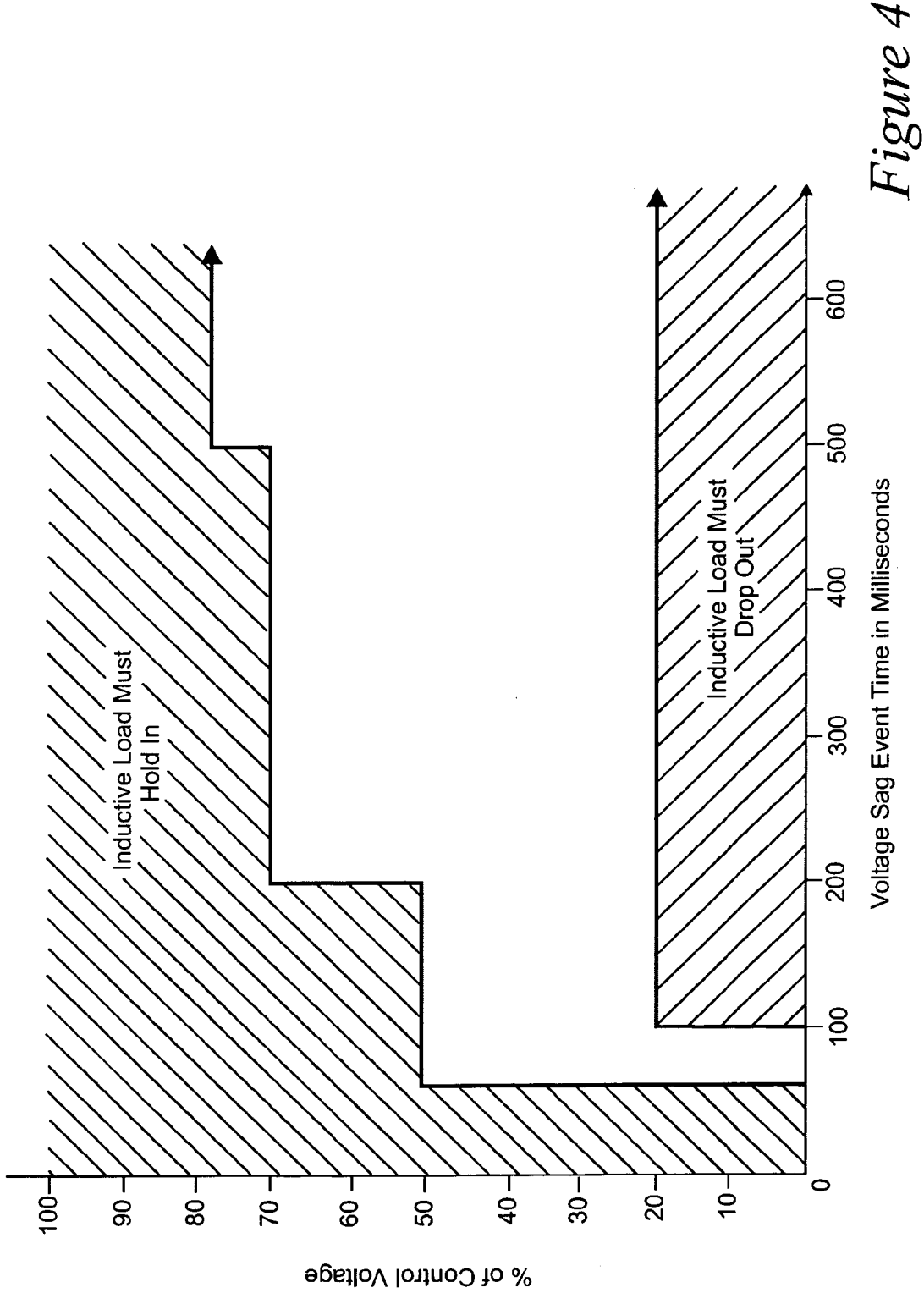
FIG. 4 is a graph showing the relationships of the holding and dropout conditions of the inductive load with respect to the percent of control voltage and time, starting at the beginning of a voltage sag event.

The graph of FIG. 4 illustrates, in general, typical relationships of the holding and dropout conditions of the inductive load 62 with respect to the percent of control voltage and time, starting at the beginning of a voltage sag event. Zero on the time line of this graph indicates the point at which a voltage sag event starts. This graph illustrates operating parameters which one might expect to find in an industry standard. It is not intended to reflect operating parameters of the claimed control circuit or any currently known industry standards or requirements. The FSM control circuit 46 must maintain the inductive load 62 in the holding condition for voltage sags down to 0% of the control voltage for a very short time period (for instance up to 75 milliseconds) at the beginning of a voltage sag event, and for lesser percentages of voltage sag over a longer time period, as shown in the stepped holding state line of FIG. 4. The FSM control circuit 46 must cause the inductive load 62 to be in the dropout condition when the control voltage sag remains below a dropout threshold, for instance 20% of control voltage, after the initial deep voltage sag, as shown by the dropout line in FIG. 4.

We claim:

1. A circuit providing constant average current, said circuit comprising:
    a full-wave bridge rectifier providing a rectified DC power output;
    a micro-controller for monitoring a component of said rectified DC power, evaluating said monitored component and providing an output signal in response to said evaluation of said monitored component;
    an output switch operating in response to said output signal for selectively providing said rectified DC power at a constant average current to an electrical device connected electrically in series with said full-wave bridge rectifier and said output switch.

2. The circuit of claim 1, wherein said monitored component of the rectified DC power is the voltage.

3. The circuit of claim 1, wherein said monitored component is evaluated with respect to a setpoint measured in volt-seconds.

4. The circuit of claim 1, wherein said constant average current is obtained by applying constant volt-seconds to said electrical device.

5. The circuit of claim 1, wherein said monitoring, evaluating and providing said output signal are concurrent operations initiated by a trigger.

6. The circuit of claim 5, wherein said trigger is a regularly spaced event determined by said micro-controller.

7. An open loop voltage sag compensator circuit comprising:
    a full-wave bridge rectifier providing a rectified DC power output;
    a micro-controller for monitoring a component of said rectified DC power at evenly spaced intervals, evaluating said monitored component with respect to a setpoint and providing an output signal in response to said evaluation of said monitored component;
    an output switch operating in response to said output signal for selectively providing said rectified DC power at a constant average current to an electrical device connected electrically in series with said full-wave bridge rectifier and said output switch.

8. The voltage sag compensation circuit of claim 7, wherein said monitored component of the rectified DC power is the voltage.

9. The voltage sag compensation circuit of claim 7, wherein said setpoint is measured in volt-seconds.

10. The voltage sag compensation circuit of claim 7, wherein said constant average current is obtained by applying constant volt-seconds to said electrical device.

11. The voltage sag compensation circuit of claim 7, wherein said monitoring, evaluating and providing said output signal are concurrent operations initiated by a trigger and occurring during a trigger period.

12. The voltage sag compensation circuit of claim 11, wherein said trigger is a regularly spaced event determined by said micro-controller and said trigger period is the interval between triggers.

13. The voltage sag compensation circuit of claim 12, wherein said setpoint is determined by said trigger period and a particular electrical current level required to maintain said electrical device in a desired operating condition.

14. The voltage sag compensation circuit of claim 7, wherein said micro-controller continuously evaluates said monitored component with respect to a dropout setpoint.

15. The voltage sag compensation circuit of claim 14, wherein said micro-controller initiates an output signal placing said electrical device in a dropout condition and enters a sleep mode for a predetermined period of time if said monitored component drops below said dropout setpoint.

16. The voltage sag compensation circuit of claim 15, wherein said micro-controller wakes up after said predetermined period of time and if said monitored component is above said dropout setpoint initiates said evaluating of said monitored component with respect to said setpoint and providing said output signal to said output switch for providing said constant average current to said electrical device.

17. The voltage sag compensation circuit of claim 15, wherein said micro-controller wakes up after said predetermined period of time and if said monitored component is below said dropout setpoint terminates further monitoring of said monitored component thereby maintaining said electrical device in said dropout condition.

18. An open loop voltage sag compensator circuit comprising:
    a full-wave bridge rectifier providing a rectified DC power output from an AC line input;
    a micro-controller for monitoring a component of said rectified DC power at evenly spaced intervals determined by said micro-controller, evaluating said monitored component with respect to a setpoint at each said evenly spaced interval and providing at least one output signal in response to said evaluation of said monitored component per each said evenly spaced interval in real time;

an output switch operating in response to said output signal for selectively providing said rectified DC power at a constant average current to an inductive device connected electrically in series with said full-wave bridge rectifier and said output switch.

19. The voltage sag compensation circuit of claim 18, wherein said monitored component of the rectified DC power is the voltage.

20. The voltage sag compensation circuit of claim 18, wherein said setpoint is measured in volt-seconds.

21. The voltage sag compensation circuit of claim 18, wherein said constant average current is obtained by applying constant volt-seconds to said inductive device.

* * * * *